United States Patent
Liu et al.

(10) Patent No.: US 8,892,529 B2
(45) Date of Patent: Nov. 18, 2014

(54) DATA PROCESSING METHOD AND APPARATUS IN CLUSTER SYSTEM

(71) Applicant: Huawei Technologies Co., Ltd., Shenzhen, Guangdong (CN)

(72) Inventors: Qiang Liu, Chengdu (CN); Quancheng Sun, Chengdu (CN); Xiaobo Liu, Chengdu (CN); Jun You, Chengdu (CN); Huadi Yang, Chengdu (CN); Dan Zhou, Shenzhen (CN); Yan Huang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/140,403

(22) Filed: Dec. 24, 2013

(65) Prior Publication Data

US 2014/0201169 A1 Jul. 17, 2014

Related U.S. Application Data

(63) Continuation of application No. PCT/CN2012/086413, filed on Dec. 12, 2012.

(51) Int. Cl.
*G06F 17/30* (2006.01)

(52) U.S. Cl.
CPC .......... *G06F 17/30156* (2013.01); *G06F 17/30* (2013.01)
USPC ....................................................... 707/692

(58) Field of Classification Search
CPC .......... G06F 12/0253; G06F 17/30156; G06F 3/0641; G06F 17/3015; G06F 17/30159
USPC ........... 707/692, 696, 698, 813, 610; 711/154
See application file for complete search history.

(56) References Cited

U.S. PATENT DOCUMENTS

| | | | |
|---|---|---|---|
| 5,990,810 A * | 11/1999 | Williams | 341/51 |
| 8,370,315 B1 * | 2/2013 | Efstathopoulos et al. | 707/696 |
| 8,442,941 B2 * | 5/2013 | Yao et al. | 707/610 |
| 8,712,978 B1 * | 4/2014 | Shilane et al. | 707/693 |
| 2008/0005141 A1 * | 1/2008 | Zheng et al. | 707/101 |

(Continued)

FOREIGN PATENT DOCUMENTS

| | | |
|---|---|---|
| CN | 201804331 U | 4/2011 |
| CN | 102479245 A | 5/2012 |
| CN | 102495894 A | 6/2012 |
| WO | 2011006859 A1 | 1/2011 |

OTHER PUBLICATIONS

Yinjin Fu et al., "A scalable inline cluster deduplication framework for big date protection", dated May 30, 2012, total 22 pages.

*Primary Examiner* — Hung T Vy
(74) *Attorney, Agent, or Firm* — Huawei Technologies Co., Ltd.

(57) ABSTRACT

In embodiments of the present invention, when a duplicate data query is performed on a received data stream, a first physical node which corresponds to each first sketch value and is in a cluster system is identified according to a first sketch value representing the data stream, and then the first sketch value representing the data stream is sent to the identified physical node for the duplicate data query, and a procedure of the duplicate data query does not change with an increase of the number of nodes in the cluster system; therefore, a calculation amount of each node does not increase with an increase of the number of nodes in the cluster system.

13 Claims, 9 Drawing Sheets

(56) References Cited

U.S. PATENT DOCUMENTS

| | | | |
|---|---|---|---|
| 2010/0281081 A1* | 11/2010 | Stager et al. | 707/814 |
| 2011/0289281 A1* | 11/2011 | Spackman | 711/154 |
| 2012/0136842 A1 | 5/2012 | Zhu et al. | |
| 2012/0158670 A1* | 6/2012 | Sharma et al. | 707/692 |
| 2013/0138620 A1* | 5/2013 | Yakushev et al. | 707/698 |

* cited by examiner

DATA PROCESSING METHOD AND APPARATUS IN CLUSTER SYSTEM

CROSS-REFERENCE TO RELATED APPLICATIONS

This application is a continuation of International Application No. PCT/CN2012/086413, filed Dec. 12, 2012, which is hereby incorporated by reference in its entirety.

TECHNICAL FIELD

Embodiments of the present invention relate to storage technologies, and in particular, to a data processing method and apparatus in a cluster system.

BACKGROUND

Data deduplication (deduplication for short) is also called intelligent compression or single instance storage, and is a storage technology that can automatically search for duplicate data, only reserve a unique copy for same data, and use a pointer pointing to a single copy to replace other duplicate copies, so as to meet requirements for eliminating redundant data and reducing storage capacity.

Cluster data deduplication (cluster deduplication for short) refers to a technology that organizes multiple deduplication physical nodes to improve deduplication performance and capacity. In the cluster deduplication technology in the prior art, generally, a physical node receiving a data stream divides the data stream into several data blocks, groups the obtained data blocks, and for each group, samples a part of metadata information from metadata information of data blocks in the group and sends the part of metadata information to all physical nodes in a cluster system for a query; each physical node in the cluster system stores a known data block and corresponding metadata information, compares the sampled metadata information with the metadata information stored in each physical node, obtains a target physical node having the most duplicate data blocks from a query result, and then sends all data block information of a data group corresponding to the sampled metadata information to the target physical node for a duplicate data query.

Through the research, the inventor finds that: In the cluster deduplication technology in the prior art, the sampled metadata information needs to be sent to all the physical nodes for a query, which leads to a large number of times of interactions between the physical nodes in a deduplication process, and in the case that there are many physical nodes in a cluster system, when each physical node performs deduplication, a calculation amount is increased with an increase of the number of physical nodes in the cluster system, which leads to degradation of deduplication performance of the system.

SUMMARY

Embodiments of the present invention provide a data processing method and apparatus in a cluster system, so as to effectively improve deduplication performance of the cluster system.

To achieve the objective of the present invention, a first aspect of the embodiments of the present invention provides a data processing method in a cluster system, where the method includes:

dividing a data stream received by a current physical node into m data blocks, obtaining a fingerprint of each data block, and obtaining, according to a first algorithm, n first sketch values representing the data stream, where m is an integer larger than or equal to 1, and n is an integer larger than or equal to 1 and smaller than or equal to m;

identifying, according to a second algorithm, a first physical node which corresponds to each first sketch value in the n first sketch values and is in the cluster system, and sending each first sketch value to the corresponding first physical node for a query;

receiving at least one response message from first physical nodes corresponding to the n first sketch values, and obtaining a storage address corresponding to the first sketch value from the response message;

obtaining a first storage address from all received storage addresses, comparing a fingerprint of a data block stored in a storage region pointed to by the first storage address with the fingerprint of each data block obtained through dividing the data stream, and querying a duplicate data block, where an obtained non-duplicated data block is used as a new data block; and obtaining at least one second sketch value representing the new data block, identifying, according to the second algorithm, a second physical node corresponding to each second sketch value in the second sketch value, storing correspondence between each second sketch value and a storage address of a data block represented by each second sketch value in the corresponding second physical node.

In combination with the first aspect, in a first possible manner of the first aspect, the obtaining a first storage address from all received storage addresses includes: obtaining, from the response message, the storage address corresponding to the first sketch value, collecting statistics about the number of hits of each storage address carried in the response message, and selecting s storage addresses having the largest number of hits as the first storage address, where s is larger than or equal to 1.

In combination with the first possible manner of the first aspect, in a second possible manner, the method further includes: according to a preset storage policy, selecting a storage address at which the new data block and a fingerprint of the new data block are written, and when a preset storage condition is met, writing the new data block and the fingerprint of the new data block into a storage region pointed to by the selected storage address.

In combination with the second possible manner of the first aspect, in a third possible manner, that a preset storage condition is met includes: the new data block is stored in a cache of the current physical node, and when data in the cache of the current physical node reaches a second preset threshold, the preset storage condition is met.

A second aspect of the embodiments of the present invention provides a data processing apparatus in a cluster system, where the apparatus includes:

a dividing unit, configured to divide a data stream received by a current physical node into m data blocks, and obtain a fingerprint of each data block, where m is an integer larger than or equal to 1;

a sketch value obtaining unit, configured to obtain, according to a first algorithm, n first sketch values representing the data stream, where n is an integer larger than or equal to 1 and smaller than or equal to m;

an identifying unit, configured to identify, according to a second algorithm, a first physical node which corresponds to each sketch value in the n first sketch values and is in the cluster system;

a sending unit, configured to send each first sketch value to the corresponding first physical node for a query;

a receiving unit, configured to receive a response message from the first physical node and obtain a first storage address from the response message;

a querying unit, configured to compare a fingerprint of a data block in a storage region pointed to by the first storage address with the fingerprint of each data block obtained through dividing the received data stream, and query a duplicate data block, where an obtained non-duplicated data block is used as a new data block; and an updating unit, configured to obtain at least one second sketch value representing the new data block, identify, according to the second algorithm, a second physical node corresponding to each second sketch value in the second sketch value, and store correspondence between each second sketch value and a storage address of a data block represented by each second sketch value in the corresponding second physical node.

In combination with the second aspect, in a first possible implementation manner, the receiving unit includes:

a statistics collecting subunit, configured to collect statistics about the number of hits of each storage address carried in the response message; and an address obtaining subunit, configured to select, according to a statistical result of the statistics collecting subunit, s storage addresses having the largest number of hits as the first storage address, where s is larger than or equal to 1.

In combination with the second aspect and the first possible manner of the second aspect, in a second possible implementation manner, the apparatus further includes:

a write address obtaining unit, configured to: according to a preset storage policy, select a storage address at which the new data block and a fingerprint of the new data block are written; and a writing unit, configured to: when a preset storage condition is met, write the new data block and the fingerprint of the new data block into a storage region corresponding to the selected storage address.

In combination with the second possible manner of the second aspect, in a third possible implementation manner, the writing unit is specifically configured to store the new data block in a cache of the current physical node, and when data in the cache of the current physical node reaches a second preset threshold, and the preset storage condition is met, write the new data block and the fingerprint of the new data block into the storage region corresponding to the selected storage address.

A third aspect of the embodiments of the present invention further provides a data processing apparatus in a cluster system, where the apparatus includes a processor, a memory, a bus, where the processor and the memory communicate with each other through the bus;

the memory is configured to store a program; and the processor is configured to perform the program in the memory;

the processor is configured to perform the program in the memory; where the program includes:

a dividing unit, configured to divide a data stream received by a current physical node into m data blocks, and obtain a fingerprint of each data block, where m is an integer larger than or equal to 1;

an identifying unit, configured to identify, according to a second algorithm, a first physical node which corresponds to each sketch value in the n first sketch values and is in the cluster system;

a sending unit, configured to send each first sketch value to the corresponding first physical node for a query;

a receiving unit, configured to receive a response message from the first physical node and obtain a first storage address from the response message;

a querying unit, configured to compare a fingerprint of a data block in a storage region pointed to by the first storage address with the fingerprint of each data block obtained through dividing the received data stream, and query a duplicate data block, where an obtained non-duplicated data block is used as a new data block; and an updating unit, configured to obtain at least one second sketch value representing the new data block, identify, according to the second algorithm, a second physical node corresponding to each second sketch value in the second sketch value, and store correspondence between each second sketch value and a storage address of a data block represented by each second sketch value in the corresponding second physical node.

In combination with the third aspect, in a first possible implementation manner, the receiving unit includes:

a statistics collecting subunit, configured to obtain a storage address corresponding to the first sketch value from the response message, and collect statistics about the number of hits of each storage address carried in the response message; and an address obtaining subunit, configured to select, according to a statistical result of the statistics collecting subunit, s storage addresses having the largest number of hits as the first storage address, where s is larger than or equal to 1.

In combination with the second aspect and the first possible manner of the second aspect, in a second possible implementation manner, the apparatus further includes:

a write address obtaining unit, configured to: according to a preset storage policy, select a storage address at which the new data block and a fingerprint of the new data block are written; and a writing unit, configured to: when a preset storage condition is met, write the new data block and the fingerprint of the new data block into a storage region corresponding to the selected storage address.

In combination with the second possible manner of the second aspect, in a third possible implementation manner, the writing unit is specifically configured to store the new data block in a cache of the current physical node, and when data in the cache of the current physical node reaches a second preset threshold, and the preset storage condition is met, write the new data block and the fingerprint of the new data block into the storage region corresponding to the selected storage address.

A fourth aspect of the embodiments of the present invention provides a computer program product for data processing, where the computer program product includes a computer readable storage medium storing a program code, and an instruction included in the program code is used to:

divide a data stream received by a current physical node into m data blocks, obtain a fingerprint of each data block, and obtain, according to a first algorithm, n first sketch values representing the data stream, where m is an integer larger than or equal to 1, and n is an integer larger than or equal to 1 and smaller than or equal to m;

identify, according to a second algorithm, a first physical node which corresponds to each first sketch value in the n first sketch values and is in a cluster system, and send each first sketch value to the corresponding first physical node for a query;

receive at least one response message from first physical nodes corresponding to the n first sketch values, and obtain a storage address corresponding to the first sketch value from the response message;

obtain a first storage address from all received storage addresses, compare a fingerprint of a data block stored in a storage region pointed to by the first storage address with the fingerprint of each data block obtained through dividing the data stream, and query a duplicate data block, where an obtained non-duplicated data block is used as a new data block; and obtain at least one second sketch value representing the new data block, identify, according to the second algorithm, a second physical node corresponding to each second sketch value in the second sketch value, and store correspondence between each second sketch value and a storage address of a data block represented by each second sketch value in the corresponding second physical node.

In the embodiments of the present invention, when a duplicate data query is performed on the received data stream, the first physical node which corresponds to each first sketch value and is in the cluster system is identified according to the first sketch value representing the data stream, and then, the first sketch value representing the data stream is sent to the identified physical node for the duplicate data query, the number of identified physical nodes for performing the duplicate data query does not increase with an increase of the number of nodes in the cluster system; therefore, a calculation amount of each node does not increase with an increase of the number of nodes in the cluster system, and the deduplication performance of the cluster system is effectively improved.

BRIEF DESCRIPTION OF DRAWINGS

To describe the technical solutions in the embodiments of the present invention or in the prior art more clearly, the following briefly introduces accompanying drawings required for describing the embodiments or the prior art. Apparently, the accompanying drawings in the following description show some embodiments of the present invention, and persons of ordinary skill in the art may further derive other drawings according to these accompanying drawings without creative efforts.

DESCRIPTION OF EMBODIMENTS

To make the objectives, technical solutions, and advantages of the embodiments of the present invention more clearly, the following clearly and completely describes the technical solutions in the embodiments of the present invention with reference to the accompanying drawings in the embodiments of the present invention. Apparently, the embodiments to be described are merely part rather than all of the embodiments of the present invention. All other embodiments obtained by persons of ordinary skill in the art based on the embodiments of the present invention without creative efforts shall fall within the protection scope of the present invention.

The embodiments of the present invention may be applied in a cluster system for storage, where the cluster system includes multiple physical nodes. A physical node having a deduplication engine may be used as a executing subject of the embodiments of the present invention, and performs the method in the embodiments of the present invention after taking a deduplication task.

Figure 1:
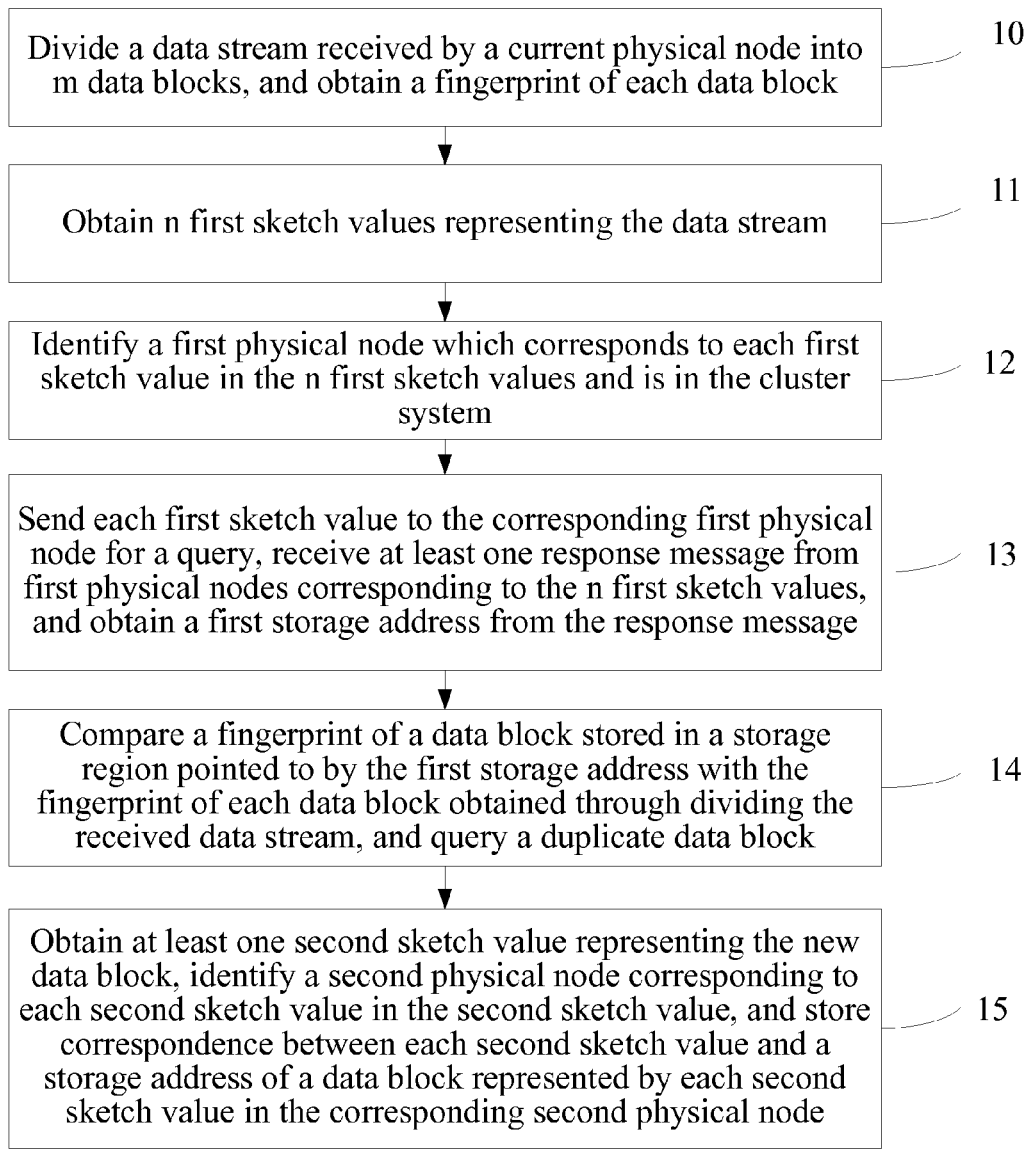
FIG. 1 is a flow chart of an embodiment of a data processing method in a cluster system according to the present invention.

FIG. 1 is a flow chart of an embodiment of a data processing method in a cluster system according to the present invention, and as shown in FIG. 1, the method in this embodiment may include:

Step 10: Divide a data stream received by a current physical node into m data blocks, and obtain a fingerprint of each data block, where m is an integer larger than or equal to 1.

In the cluster system, a physical node may be used as a node for performing a cluster deduplication task as long as an apparatus for performing the data processing method in the embodiment of the present invention is installed on the physical node.

After receiving the data stream, the current physical node divides data in the data stream into m data blocks and obtain the fingerprint of each data block.

Step 11: Obtain, according to a first algorithm, n first sketch values representing the data stream, where n is an integer larger than or equal to 1 and smaller than or equal to m.

The n first sketch values representing the data stream are obtained through a preset algorithm, and for convenience of description, an algorithm for obtaining a first sketch value representing the data stream is called the first algorithm, and a sketch value representing the received data stream is called the first sketch value.

The first algorithm is not limited in the embodiment of the present invention as long as the first algorithm is capable of obtaining the first sketch value representing the data stream. For example, the data blocks obtained through dividing are directly sampled, and a sketch value of the sampled n data blocks is calculated, and the calculated sketch value is used as a sketch value representing the received data stream.

Optionally, to make the sampled data evener, in the embodiment of the present invention, the obtaining the n first sketch values representing the data stream according to the first algorithm may include the following steps:

The fingerprints of the data blocks obtained according to the received data stream are grouped into n first fingerprint groups, where each first fingerprint group includes fingerprints of at least two data blocks.

For each first fingerprint group, a first sketch value representing each fingerprint group is obtained, so as to obtain the n first sketch values.

If n is equal to 1, it indicates that the fingerprints corresponding to the data blocks obtained from the received data stream are grouped into one first fingerprint group, and one fingerprint is directly sampled as a first sketch value of the first fingerprint group from the fingerprints corresponding to the data blocks obtained through dividing.

In the embodiment of the present invention, multiple consecutive data blocks may be grouped into one first fingerprint group, and certainly, there are multiple methods for dividing data blocks to obtain a first fingerprint group, and are not limited in this embodiment.

In the embodiment of the present invention, if a first sketch value is obtained in a manner of dividing a data stream into data blocks and then grouping the fingerprints corresponding to the data blocks, correspondingly, there may also be multiple methods for obtaining a first sketch value from each fingerprint group as long as the first sketch value is capable of representing a corresponding first fingerprint group. For example, a largest fingerprint among the fingerprints of the data blocks may be selected as the first sketch value, or fingerprint information of one or more data blocks is randomly selected as the first sketch value from a first fingerprint group, which is not limited in the embodiment of the present invention.

In this embodiment, a value of a smallest fingerprint, that is, the smallest fingerprint, may also be selected, from fingerprint information of all data blocks in the first fingerprint group, as a first sketch value representing a fingerprint group to which the smallest fingerprint belongs.

Step 12: Identify, according to a second algorithm, a first physical node which corresponds to each first sketch value in the n first sketch values and is in the cluster system.

In the embodiment of the present invention, for convenience of description, a physical node corresponding to the identified first sketch value is called the first physical node, and an algorithm for identifying the first physical node is called the second algorithm; and if one first sketch value corresponds to one first physical node, the n first sketch values may correspond to n first physical nodes, to which the embodiment of the present invention is certainly not limited here.

There may also be multiple second algorithms. For example, root extraction and rounding operations are performed on the first sketch value until the value is smaller than m, and a final result is rounded to obtain the corresponding first physical node.

In this embodiment, the adopted second algorithm may further be: A modulus operation is performed on the number of all physical nodes in the cluster system by the first sketch value, and the first physical node which corresponds to the first sketch value and is in the cluster system is obtained.

Step 13: Send each first sketch value to the corresponding first physical node for a query, receive at least one response message from first physical nodes corresponding to the n first sketch values, and obtain a first storage address from the response message.

In the embodiment of the present invention, in the cluster system, each or most physical nodes store an index table, where correspondence between a sketch value and a storage address of a stored data block represented by the sketch value is stored in the index table, and the index table is stored in a physical node in the cluster system according to a preset policy, and a data block and fingerprint information corresponding to the data block are stored in a storage region pointed to by a different storage address.

It should be noted that, an index table in each physical node may be a complete index table and includes correspondence between all sketch values of stored data and storage addresses of stored data blocks represented by the sketch values in the cluster system, and a part of a complete index table may also be stored in each physical node according to a preset policy, so as to reduce a calculation amount for querying a duplicate block in a physical node. The latter manner may be adopted in this embodiment. How to store, in a physical node, each index entry in the index table is described in detail in the following.

In the embodiment of the present invention, the index table is stored in a physical node according to a preset policy, there is no direct relationship between data in an index table in a certain physical node and data in the physical node, and the index table is just stored in the certain physical node according to a preset allocation policy.

In specific implementation, because a storage region corresponding to one storage address may have data of multiple groups, and if a sketch value is selected from each group, a case that one storage address corresponds to multiple different sketch values may occur; therefore, a same storage address in the index table may correspond to multiple different sketch values; however, one same sketch value corresponds to one storage address. When multiple first sketch values are queried in the index table, multiple corresponding storage addresses may be obtained, and when the first storage address is selected from a storage address corresponding to the first sketch value, a rule for selecting the first storage address may be preset or may be set by a user according to an actual situation, which is not limited in this embodiment.

For example, the storage address corresponding to the first sketch value may be obtained from the response message, statistics about the number of hits of each storage address carried in the response message is collected, and s storage addresses having the largest number of hits are selected as the first storage address, where s is larger than or equal to 1.

In specific implementation, when receiving a query request carrying the first sketch value, the first physical node matches a sketch value same as the first sketch value according to a locally stored index table, and feeds back, through a response message, a storage address corresponding to the matched sketch value to a physical node sending the query request. Each first sketch value corresponds to one first physical node; therefore, multiple first physical nodes receive a query request, and locally perform a query according to the query request. If the storage address is found through the query, the storage address is returned to a node sending the query request, and the node sending the query request may receive multiple storage addresses returned by different first physical nodes, and if the storage address is not found through the query, a null value, for example, 0, is fed back, or no feedback is returned, and how to specifically represent that the storage address is not found through the query may be set by a user.

In a case that the storage address fed back by the first physical node is not received after each first sketch value is sent to the corresponding first physical node for a query, a data block obtained through dividing the data stream is used as a non-duplicated data block, and then step 15 is performed.

Step 14: Compare a fingerprint of a data block stored in a storage region pointed to by the first storage address with the fingerprint of each data block obtained through dividing the received data stream, and query a duplicate data block, where an obtained non-duplicated data block is used as a new data block.

In specific implementation, the current physical node stores data blocks and fingerprint information after processing the received data stream in a cache, and may adopt multiple methods to compare the fingerprints of the data blocks. For example, in Method 1, a data block in the storage region corresponding to the first storage address is loaded into the cache of the current physical node, and a comparison with the fingerprint of each data block corresponding to the received data stream is performed for a duplicate block query; in Method 2, a query instruction is sent to the physical node pointed to by the first storage address, where the fingerprints of the m data blocks obtained through dividing the data stream are carried in the query instruction, and a query result returned by the physical node pointed to by the first storage address is received. In Method 1, fingerprint information stored in the cache of the current node may be used in a duplicate data query, which can further improve a deduplication rate.

When an index entry in the index table is initialized, a user may also prestore, in the index table and according to stored data in the system, correspondence between a known sketch value and a storage address of a data block represented by the known sketch value, and a specific manner is not limited in the embodiment of the present invention. The index table may also be null during initialization, and during the duplicate data query, when an obtained new data block is stored in a storage system, an obtained sketch value and a storage address of the new data block represented by the sketch value are inserted into the index table, so that the index table is constantly updated; therefore, the embodiment of the present invention further includes:

Step 15: Obtain at least one second sketch value representing the new data block, identify, according to the second algorithm, a second physical node corresponding to each second sketch value in the second sketch value, and store correspondence between each second sketch value and a storage address of a data block represented by each second sketch value in the corresponding second physical node.

In the embodiment of the present invention, the non-duplicated data block found through the query is used as the new data block, and when the new data block that is found through the query reaches a certain size and needs to be stored, a storage location of the new data block in the system needs to be indicated in the index table; therefore, the index table needs to be constantly updated. When the storage address is obtained for the new data block, a sketch value representing the new data block is obtained, and is called the second sketch value for convenience of description, the second physical node is identified according to the second algorithm, and the correspondence between each second sketch value and a storage address of a data block represented by each second sketch value is stored in the corresponding second physical node, thereby implementing constant update of an index entry in the cluster system.

A method for obtaining the second sketch value may be the same as an algorithm for obtaining the first sketch value. For example, the first algorithm may be adopted, and in a case that it is ensured that a set of first sketch values is a subset of a set of second sketch values, or a set of second sketch values is a set of first sketch values, other algorithms may also be adopted.

Figure 2:
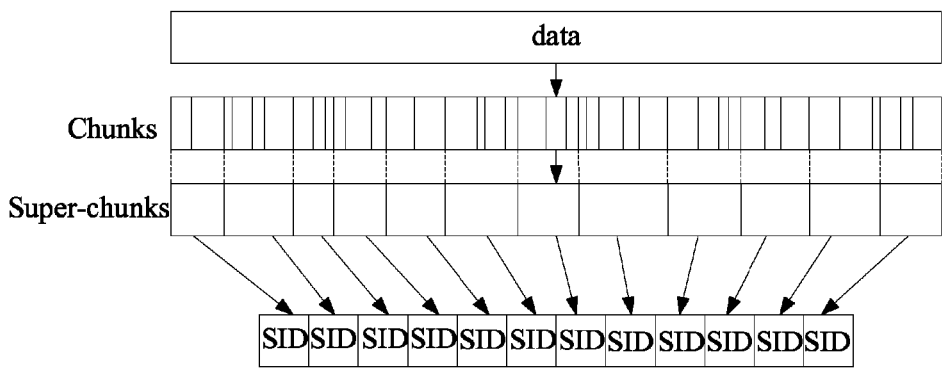
FIG. 2 is a schematic diagram of block dividing and sampling performed by a physical node after a data stream is received according to an embodiment of the present invention.

The solution in this embodiment is described in detail with reference to an example of a specific implementation manner in the following. FIG. 2 is a schematic diagram of block dividing and sampling performed by a current physical node after a data stream is received. In this embodiment, multiple data blocks may be regarded as one super data block (super-chunk); therefore, in specific implementation, for more accurate grouping, fingerprints corresponding to data blocks are grouped, a data block corresponding to fingerprints in a group is a super data block, and a first sketch value is obtained from each fingerprint group, and the first sketch value may also be called a super-data-block sketch value (super-chunk ID, SID), and certainly, data blocks obtained through dividing the data stream may also be directly grouped. Referring to FIG. 2, after receiving the data stream, the current physical node divides the received data into data blocks, several consecutive data blocks are grouped into one group, that is, a super-chuck in the accompanying drawing, and a grouping manner includes a manner such as dividing of variable-length blocks or dividing of a fixed-length blocks, which is not limited in this embodiment. A data block is obtained from each super-chunk, and a fingerprint corresponding to the obtained data block is used as an SID representing each super-chunk.

Figure 3:
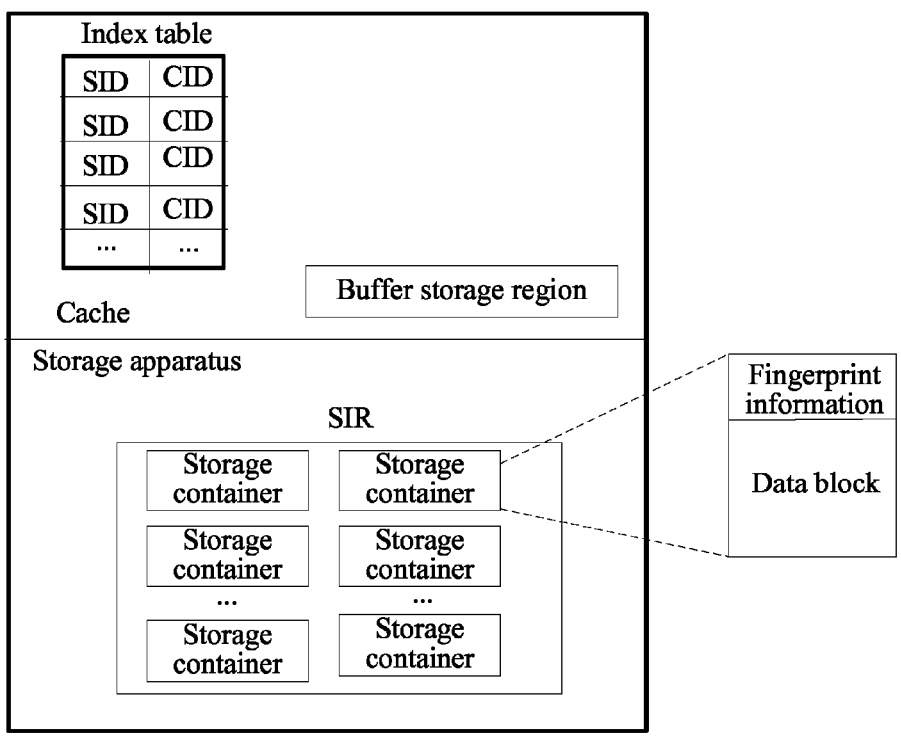
FIG. 3 is a schematic diagram of an internal structure of a physical node according to an embodiment of the present invention.

By taking a physical node in a cluster system as an example, reference may be made to FIG. 3 for an exemplary schematic diagram of an internal structure of the physical node. A cache and a storage region may be included in each physical node, and in specific implementation, in order to improve query performance, an index table is stored in the cache of the physical node, where correspondence between a second sketch value and a storage address of a stored data block represented by the second sketch value is stored in the index table. As described above, an index table in each physical node may be a complete index table and includes correspondence between all second sketch values and storage addresses of fingerprints of stored data blocks represented by the second sketch values in the cluster system, and a part of a complete index table may also be stored in each physical node according to a preset policy. In specific implementation, in order to reduce use of a memory, the latter manner may be adopted, and a part of a complete index table is stored in each physical node according to a preset policy. For example, by taking a sketch value A as an example, a physical node is identified by performing a modulus operation on the total number of all physical nodes in the cluster system by A, and correspondence between A and a storage address of a stored data block represented by A is stored in the identified physical node; and during a duplicate data query, a modulus operation is performed on the total number of physical nodes in the cluster system by an obtained first sketch value to obtain a first physical node corresponding to the first sketch value.

Each physical node includes a storage apparatus, which enables each physical node to have a function of storing data for a long time, the storage apparatus may be a magnetic disk and may also be another storage apparatus, for example, an SSD, and the storage apparatus in each physical node is called a single instance repository (single instance repository, SIR), and in FIG. 3, a magnetic disk is taken as an example. There may be many storage regions in a storage apparatus in a physical node, and in specific implementation, each storage region may be figuratively regarded as a container (container) for storing data, each storage container has one unique serial number in the cluster system, which may be called a storage container serial number (container ID, CID), and the container serial number indicates a location of the storage container in the cluster system, for example, which storage region in which physical node in the cluster system. Therefore, in specific implementation, the foregoing storage address of the stored data block is embodied as a CID, which indicates in which storage region in which physical node the data block is stored, and in specific implementation, the correspondence between a sketch value and a storage address of a stored data block represented by the sketch value in the foregoing index table may be indicated as correspondence between an SID and a CID, and in addition to a storage data block, fingerprint information corresponding to a data block may be further stored in each storage region. A buffer storage region (container buffer) may be further included in a cache of each physical node and is configured to temporarily store a new data block obtained through identifying.

In the prior art, sampled fingerprint information is sent to all nodes for a query, and in this way, in a case that the number of nodes in the cluster system is increased, the calculation amount becomes larger and larger. An experiment shows that, when the number of nodes in a cluster system exceeds 16, deduplication performance of the system is degraded to a great extent. In the embodiment of the present invention, different from the prior art in which a sampled sketch value is sent to all nodes for a query, when a duplicate data query is performed on a received data stream, the first physical node which corresponds to each first sketch value and is in the cluster system is identified according to the first sketch value representing the data stream, then the first sketch value representing the data stream is sent to the identified physical node for the duplicate data query, and a procedure of the duplicate data query does not change with an increase of the number of nodes in the cluster system; therefore, the calculation amount of each node does not increase with an increase of the number of nodes in the cluster system.

Figure 4:
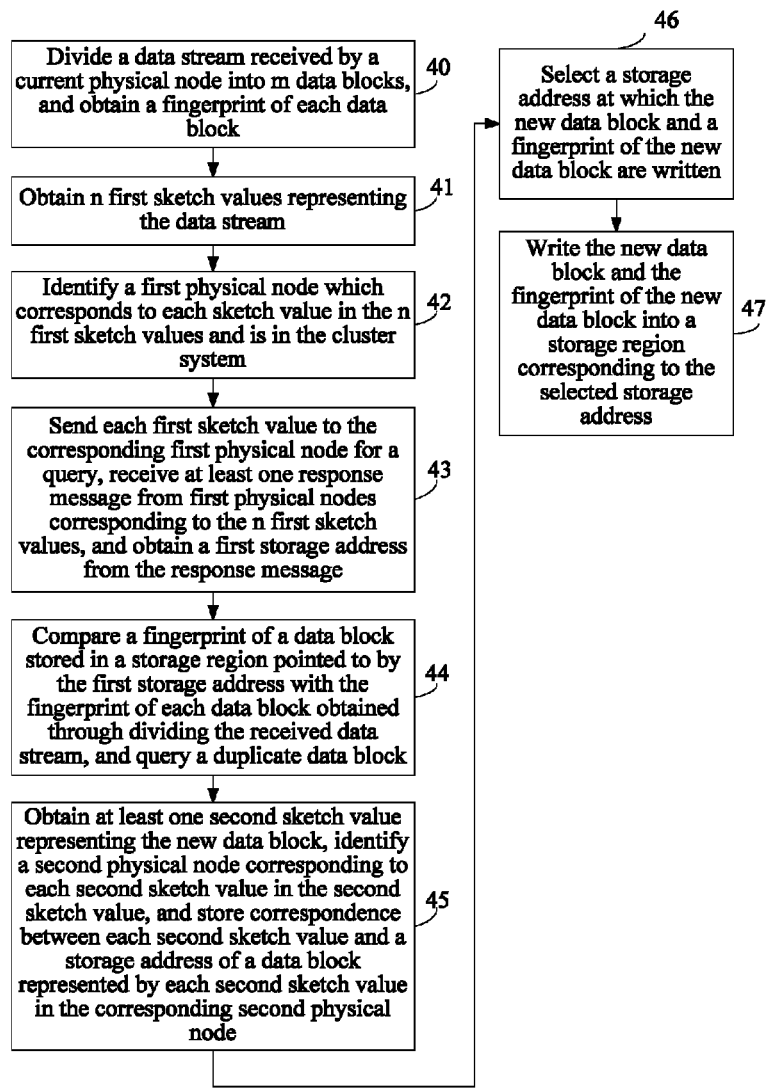
FIG. 4 is a flow chart of an embodiment of another data processing method in a cluster system according to the present invention.

Referring to FIG. 4, the present invention further provides an embodiment of another cluster data processing method, and a difference from the data processing method in a cluster system corresponding to FIG. 1 lies in that, after a duplicate data query in the cluster system is finished, it is required to determine whether there is a new data block in a received data stream and store the new data block, and other steps are the same as those in the embodiment corresponding to FIG. 1; therefore, on the basis of the embodiment corresponding to FIG. 1, the method may further include:

Step 46: According to a preset storage policy, select a storage address at which the new data block and a fingerprint of the new data block are written.

The storage policy of the new data block may be preset by a user, and there may be multiple policies. For example, in Policy 1, load information of each physical node in the cluster system is first obtained, a physical node into which data is migrated is selected according to the load information, the storage address at which the new data block and the fingerprint of the new data block are written is obtained from the selected physical node into which data is migrated, and in this way, load balancing among all physical nodes may be achieved; in Policy 2, load information may also not be determined, the storage address at which the new data block and the fingerprint of the new data block are written is directly obtained from the current physical node, and in this manner, exchange between nodes may be reduced. Therefore, a specific storage policy may be set by a user according to an actual situation, which is not limited in the embodiment of the present invention.

If Policy 1 is adopted, there may be multiple manners for writing data according to the load information. For example, a threshold may be preset and may be called a first preset threshold, and when an average load value of all the physical nodes in the cluster system exceeds the preset first preset threshold, a node into which data is written is selected from a physical node whose load value is smaller than the average load value, the storage address at which the new data block and the fingerprint of the new data block are written is obtained from the node into which data is written, and when the average load value of all the physical nodes in the cluster system is smaller than or equal to the first preset threshold, the storage address at which the new data block and the fingerprint of the new data block are written is obtained from the current physical node.

Another method for performing data migration according to a load value may include:

A1: Obtain load information of the physical nodes in the cluster system, and when a load difference between any two physical nodes in the cluster system is larger than the first threshold, a node into which data is migrated is selected from a physical node whose load is lower, and obtain the storage address at which the new data block and the fingerprint of the new data block are written from the node into which data is migrated.

A2: When a load difference between any two physical nodes in the cluster system is smaller than or equal to the first threshold, obtain, from the current physical node, the storage address at which the new data block and the fingerprint of the new data block are written.

The load information may be obtained by the current physical node, and the load information may also be directly obtained by the current physical node from a third party after the third party obtains the load information.

Step 47: When a preset storage condition is met, write the new data block and the fingerprint of the new data block into a storage region corresponding to the selected storage address.

Optionally, that the preset storage condition is met may include: The new data block is stored in a cache of the current physical node, and when data in the cache of the current physical node reaches a second preset threshold, the preset storage condition is met.

As described in the example in FIG. 3, a container buffer may be included in each physical node and is configured to temporarily store a new data block obtained through identifying, and when a size of data stored in the container buffer exceeds a second threshold, it may be regarded that the preset storage condition is met, and the user may set the second threshold according to an actual situation, which is not limited in this embodiment.

In the embodiment of the present invention, after the storage address of the new data block is obtained, a specific occasion for storing the correspondence between the second sketch value and the storage address of the data block represented by the second sketch value in the corresponding second physical node is not limited in the embodiment of the present invention.

In the data processing method in a cluster system provided by the embodiment corresponding to FIG. 4, load balancing is implemented and system performance is improved when the new data block is stored.

Figure 5:
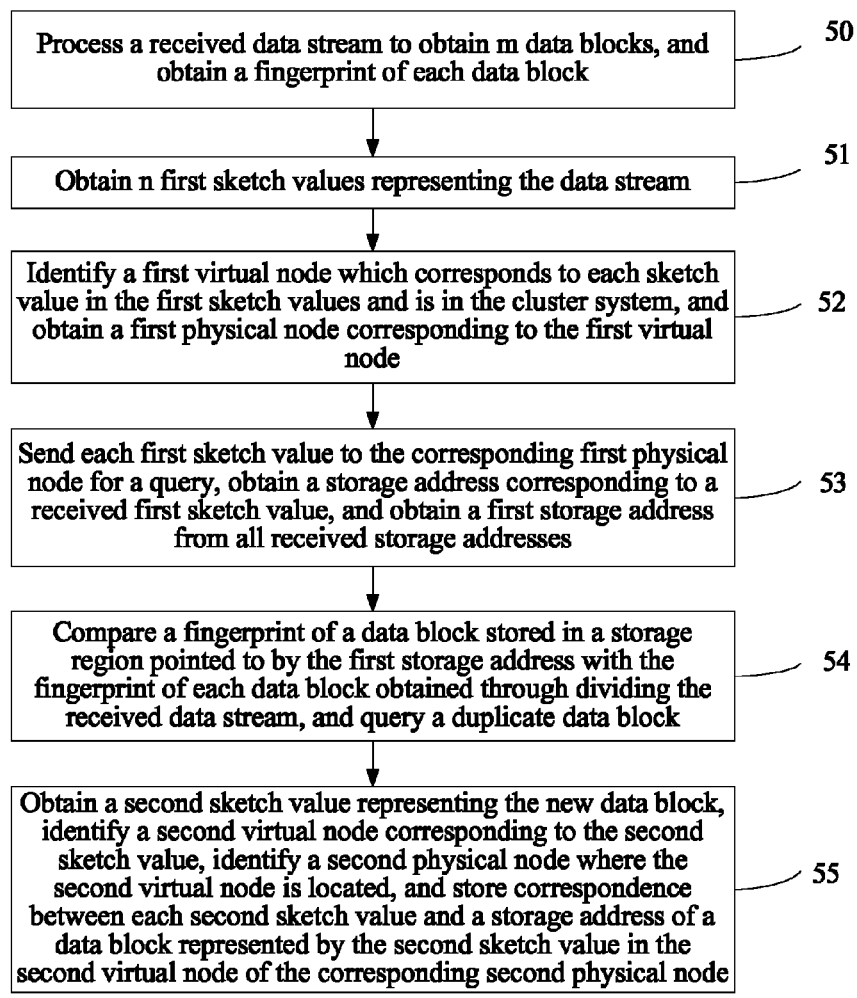
FIG. 5 is a flow chart of an embodiment of another data processing method in a cluster system according to the present invention.

On the basis of the data processing method corresponding to FIG. 1, referring to FIG. 5, for a case that a virtual node is included in a cluster system, the present invention provides another embodiment, at least one virtual node is logically obtained through dividing a physical node in the cluster system, and correspondence (VPT) between all virtual nodes and all physical nodes in the cluster system is stored in each physical node, and in the embodiment of the present invention, it is assumed that at least one virtual node is logically obtained through dividing each physical node, and a duplicate data query method includes:

Step 50: Process a data stream received by a current physical node to obtain m data blocks, and obtain a fingerprint of each data block.

Step 51: Obtain, according to a first algorithm, n first sketch values representing the data stream, where n is an integer larger than or equal to 1 and smaller than or equal to m.

A manner for processing the data stream and a manner for obtaining the first sketch values in steps 50 and 51 are the same as those in the embodiment corresponding to FIG. 1, and are not repeatedly described here.

Step 52: Identify, according to a second algorithm, a first virtual node which corresponds to each sketch value in the n first sketch values and is in the cluster system, and by querying correspondence between a virtual node in the current physical node and a physical node, obtain a first physical node corresponding to the first virtual node, where each first sketch value corresponds to one first virtual node, and one first virtual node may correspond to several first sketch values at the same time.

For convenience of description, a corresponding virtual node identified according to the first sketch value is called the first virtual node, at least one virtual node may be obtained through dividing each physical node in a cluster storage system, and in a specific implementation solution, two or more virtual nodes may be obtained through dividing each physical node, each virtual node has a unique serial number, and correspondence between a virtual node and a physical node in a cluster system may be stored in each physical node, which indicates in which physical node the virtual node is located.

Step 53: Send each first sketch value to the first virtual node in the corresponding first physical node for a query, receive a response message from the first physical node, obtain a storage address corresponding to the first sketch value from the response message, and select a first storage address from the storage address corresponding to the first sketch value.

In the embodiment of the present invention, each or most physical nodes in the cluster system store an index table, where correspondence between a sketch value obtained in advance and a storage address of a stored data block represented by the sketch value is stored in the index table, and the index table is stored in the physical node in the cluster system according to a preset policy, and after a virtual node is obtained through dividing a physical node, the index table may be stored in the virtual node obtained through dividing the physical node. How to store, in the virtual node, each index entry in the index table is described in detail in the following.

In a case that there is no virtual node in the cluster system of data blocks, a storage address in the index table specifically indicates which storage region in which physical node, and in a case that there is a virtual node in the cluster system, a storage address specifically indicates which storage region in which virtual node.

Similarly, an index table in each virtual node may be a complete index table and includes correspondence between all sketch values and storage addresses of fingerprints of stored data blocks represented by the sketch values in the cluster system; and a part of a complete index table may also be stored in each virtual node according to a set policy, so as to reduce use of a memory.

The first virtual node which corresponds to each sketch value in the n first sketch values and is in the cluster system is identified according to the second algorithm, similarly, there are also multiple second algorithms as long as a first sketch value can be enabled to correspond to one unique virtual node in the cluster system. For example, by taking a first sketch value A as an example, when a duplicate data query is performed on a data block, a modulus operation is performed on the number of all virtual nodes in the cluster system by the obtained first sketch value to obtain a first virtual node corresponding to the first sketch value, and then a first physical node corresponding to the first virtual node is identified according to the correspondence between a virtual node and a physical node. When the first physical node is found, the first virtual node in the first physical node is found.

Many storage regions are included in each virtual node, and in specific implementation, each storage region may be figuratively regarded as a container for storing data, each container has a unique serial number CID in the cluster system, and the number indicates in which storage region in which virtual node in the cluster system the storage region is located. In addition to a data block, fingerprint information corresponding to the data block may also be stored in each storage region.

A buffer storage region (container buffer) may also be included in a cache of each physical node and is configured to temporarily store a new data block obtained through identifying.

Similar to the embodiment corresponding to FIG. 1, in specific implementation, one same storage address in the index table may correspond to multiple different sketch values; however, one sketch value corresponds to one storage address. When multiple first sketch values are queried in the index table, multiple corresponding storage addresses may be obtained, and when the first storage address is selected from the storage address corresponding to the first sketch value, a rule for selecting the first storage address may be preset or may be set by a user according to an actual situation, and reference may be made to the description of selecting the first storage address in the method corresponding to FIG. 1, which is not limited in this embodiment.

In the embodiment of the present invention, after receiving a query request, a physical node performs a query in a local virtual node, and if the storage address is found through the query, the physical node feeds back a query result to a node sending the query request. In specific implementation, after receiving the query request, the physical node performs the query in the local virtual node, and feeds back, by placing the query result in a response message, the query result to the physical node sending the query request, if the storage address is found through the query, the storage address found through the query is placed in the response message, and if the storage address is not found through the query, a null value is fed back in the response message, or in specific implementation, no feedback is returned in a case that the storage address is not found through the query. A user may set a specific implementation manner according to an actual situation.

If the current physical node does not receive the storage address returned by the first physical nodes corresponding to the n first sketch values, a data block obtained through dividing the data stream is used as a non-duplicated data block.

Step 54: Compare a fingerprint of a data block stored in a storage region pointed to by the first storage address with the fingerprint of each data block obtained through dividing the received data stream, and query a duplicate data block, where an obtained non-duplicated data block is used as a new data block.

In specific implementation, the current physical node stores the data block and the fingerprint information after processing the received data stream in the cache, multiple methods may be adopted to compare the fingerprints of the data blocks, and reference may be made to the description in the method corresponding to FIG. 1.

Step 55: Obtain at least one second sketch value representing the new data block, identify, according to the second algorithm, a second virtual node corresponding to each second sketch value in the second sketch value, identify, according to correspondence between a virtual node and a physical node, a second physical node where the second virtual node is located, and store correspondence between each second sketch value and a storage address of a data block represented by the second sketch value in the second virtual node of the corresponding second physical node.

Figure 6:
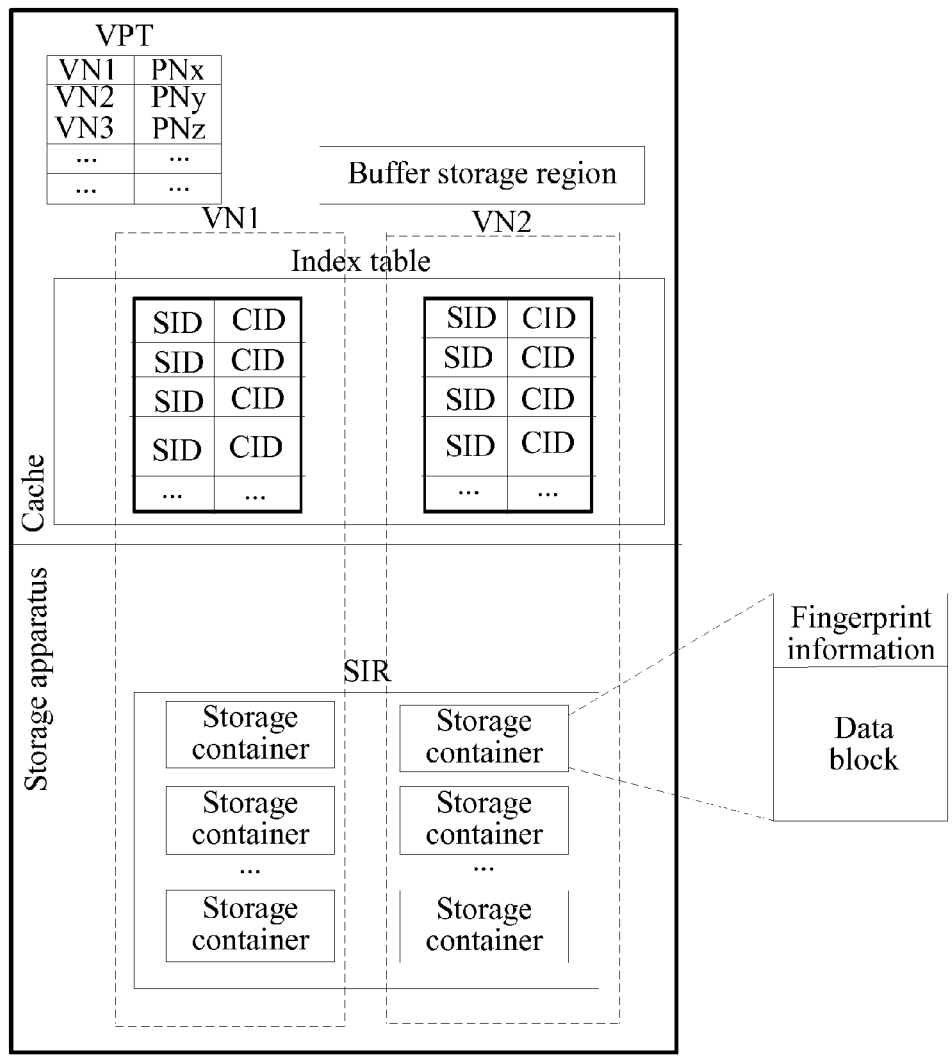
FIG. 6 is a schematic diagram of an internal structure of another physical node according to an embodiment of the present invention.

By taking that two virtual nodes are obtained through dividing a physical node in a cluster system as an example, reference may be made to FIG. 6 for an exemplary schematic diagram of an internal structure of the physical node. In FIG. 6, two virtual nodes (virtual node, VN) are obtained through dividing one physical node (physical node, PN), and an index table and a storage apparatus having a capability of storing data for a long time are included in one virtual node. A correspondence table (VPT) between a virtual node and a physical node is stored in each physical node at the same time.

In the prior art, sampled fingerprint information is sent to all nodes for a query. It is assumed that a calculation amount of performing a query in a node is z, and when there are m physical nodes, a calculation amount is z multiplied by m. In the deduplication method in a cluster system having a virtual node provided by this embodiment, when a duplicate data query is performed on the received data stream, the first physical node which corresponds to each first sketch value and is in the cluster system is identified according to the first sketch value representing the data stream, then the first sketch value representing the data stream is sent to the identified virtual node for the duplicate data query, the number of identified virtual nodes does not increase with an increase of the number of physical nodes in the cluster system, and a procedure of the duplicate data query does not change with an increase of the number of nodes in the cluster system, so as to effectively improve deduplication performance of the cluster system.

Figure 7:
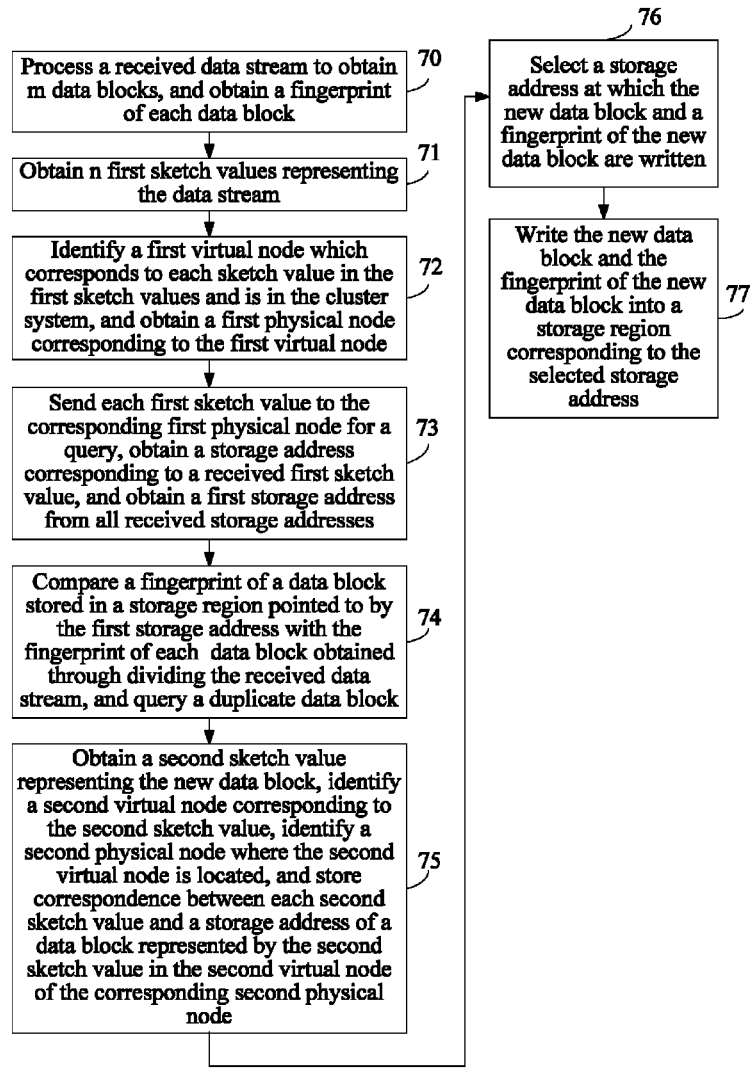
FIG. 7 is a flow chart of an embodiment of another data processing method in a cluster system according to the present invention.

Referring to FIG. 7, the present invention further provides an embodiment of a data processing method in a cluster system, and a difference from the data processing method in a cluster system corresponding to FIG. 5 lies in that, after a duplicate data query in the cluster system is finished, it is required to determine whether there is a new data block in a received data stream and store the new data block, and other steps are the same as those in the embodiment corresponding to FIG. 5; therefore, on the basis of the embodiment corresponding to FIG. 5, the method may further include:

Step 76: According to a preset storage policy, select a storage address at which the new data block and a fingerprint of the new data block are written.

The storage policy of the new data block may be preset by a user, and there may be multiple storage policies. Reference may be made to the description about how to select the storage address at which the new data block and the fingerprint corresponding to the new data block are written in the embodiment corresponding to FIG. 4, and a difference lies in that, after a physical node into which data is migrated is determined, a load of a virtual node inside the physical node is considered, and the storage address at which the new data block and the fingerprint of the new data block are written is obtained from a virtual node whose load is lower in the selected physical node into which data is migrated.

Step 77: When a preset storage condition is met, write the new data block and the fingerprint of the new data block into a storage region corresponding to the selected storage address.

As described in the example in FIG. 6, a container buffer may be included in each physical node and is configured to temporarily store a new data block obtained through identifying, and when a size of data stored in the container buffer exceeds a second threshold, it may be regarded that the preset storage condition is met, and the user may set the second threshold according to an actual situation, which is not limited in this embodiment.

After the storage address of the new data block is obtained, a specific occasion for storing the correspondence between the second sketch value and the storage address of the data block represented by the second sketch value in the corresponding second physical node is not limited in the embodiment of the present invention.

In the data processing method in a cluster system provided by the embodiment corresponding to FIG. 7, an index table in a virtual node is constantly updated, so as to further improve a probability of finding duplicate data.

Figure 8:
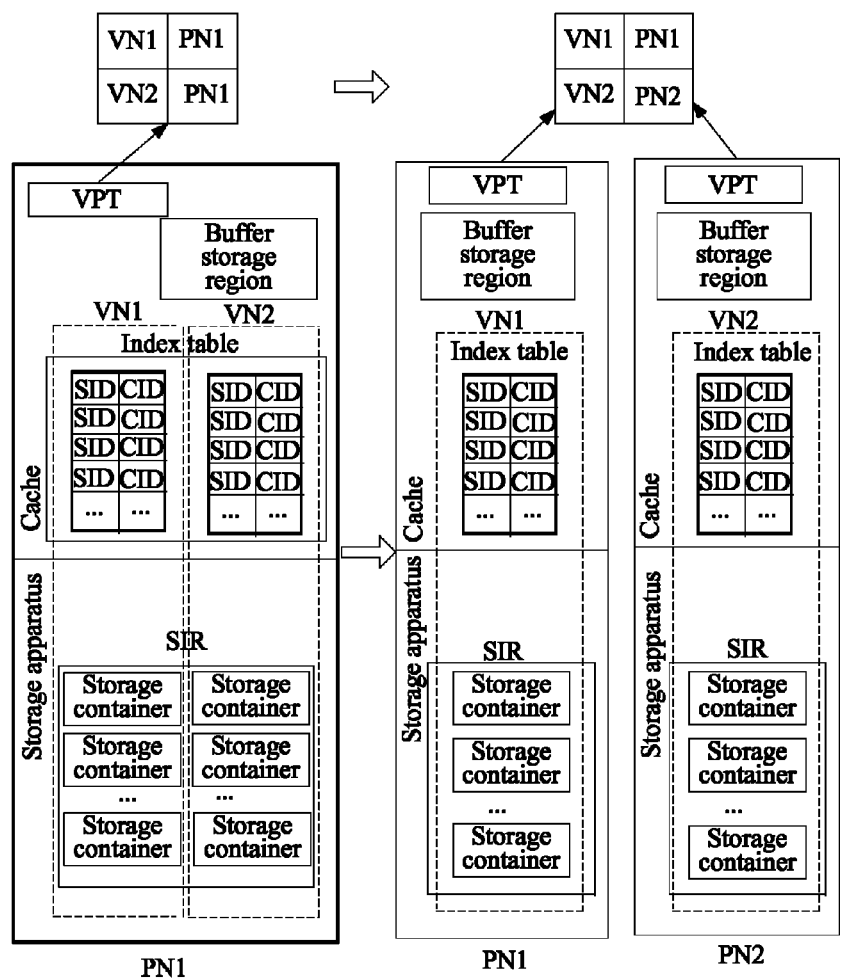
FIG. 8 is a schematic diagram of data migration according to an embodiment of the present invention.

Referring to FIG. 8, on the basis that a virtual node is included in a cluster system, a solution for data migration in a physical node in the cluster system is provided. For example, in FIG. 8, a schematic diagram of data migration in a case that one physical node is extended into two physical nodes is described.

When a data migration condition is met, one of virtual nodes in a physical node PN1 is integrally moved to another physical node PN2, which includes: moving an index table in a virtual node VN1 and data in a single instance repository that belongs to the VN1 to the PN2; updating correspondence between a migrated virtual node and a physical node in the cluster system, and notifying another physical node in the cluster system of updating the correspondence between a migrated node and a physical node. The updated correspondence between all virtual nodes and all physical nodes in the cluster system is stored in a newly-added PN2.

The data migration condition may be that data needs to be migrated into a newly-added physical node during capacity expansion of a physical node in the cluster system; and may also be that, for load balancing, data in a physical node whose load is high is migrated into a physical node whose load is low, and the data migration condition is not limited in the embodiment of the present invention.

When no virtual node is obtained through dividing in a cluster system and data in a physical node is migrated, because a data block and a storage address of a fingerprint of the data block are changed, correspondence between a logical address of the data block and a CID needs to be modified, and data in an involved CID may be stored in many physical nodes, so that a calculation amount is very large; however, by using the cluster system provided by the embodiment of the present invention, during data migration, because data in a virtual node is integrally moved, a CID in the index table indicates a location where the data is stored in the virtual node; therefore, as long as an identity of the virtual node does not change, the CID does not need to be modified, and only the correspondence between an involved virtual node and a physical node is modified, which simplifies an operation procedure during node extension and reduces the calculation amount to a great extent.

The embodiment of the present invention is applied in a cluster system for storage, and multiple storage nodes are included in the cluster system. A data processing apparatus in a cluster system provided by an embodiment of the present invention is configured to perform the foregoing data processing method in a cluster system, and the apparatus may be set in a physical node in a cluster system or set in a manager in a cluster system, or may also be set as a separate node in the cluster system. A specific location where the data processing apparatus is set is not limited in the embodiment of the present invention.

Figure 9:
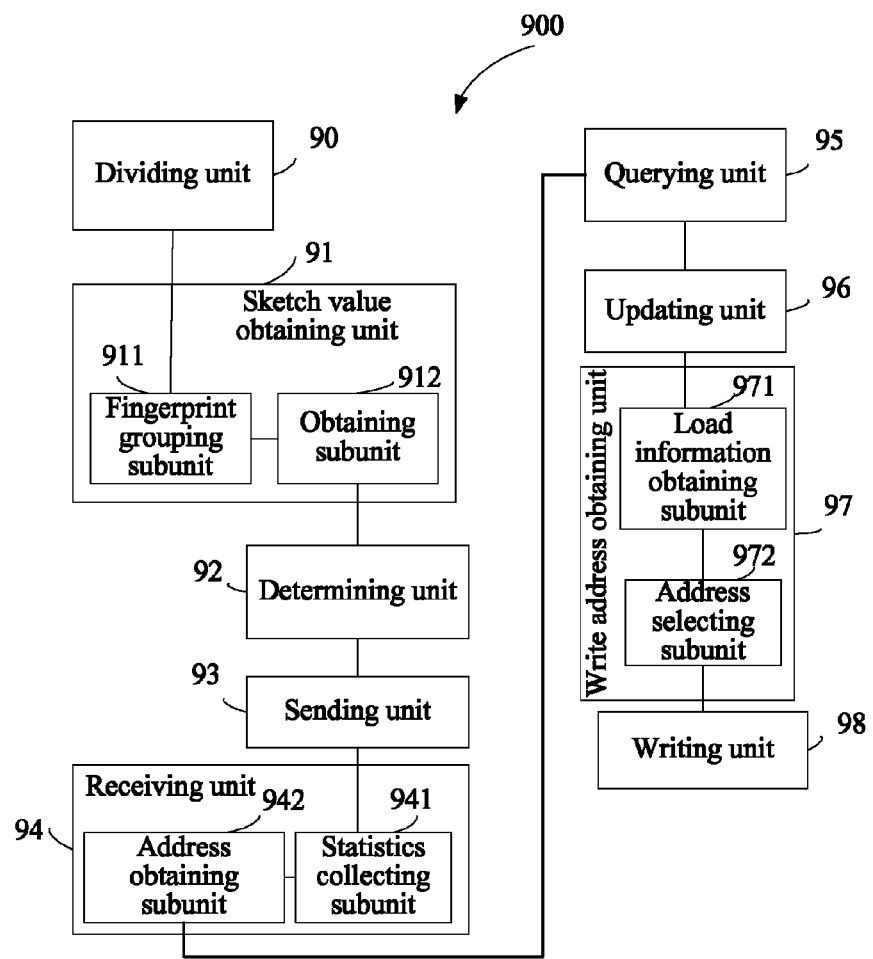
FIG. 9 is a structural diagram of a data processing apparatus in a cluster system according to an embodiment of the present invention.

Referring to FIG. 9, an embodiment of the present invention provides a data processing apparatus 900 in a cluster system, where the apparatus includes:

A dividing unit 90 is configured to divide a data stream received by a current physical node into m data blocks, and obtain a fingerprint of each data block, where m is an integer larger than or equal to 1.

A sketch value obtaining unit 91 is configured to obtain, according to a first algorithm, n first sketch values representing the data stream, where n is an integer larger than or equal to 1 and smaller than or equal to m.

Reference may be made to the description in the foregoing method for the first algorithm for obtaining the first sketch value, which is not repeatedly described here.

An identifying unit 92 is configured to identify, according to a second algorithm, a first physical node which corresponds to each sketch value in the n first sketch values and is in the cluster system.

There may be many manners for the identifying unit 92 to identify the first physical node. For example, root extraction and rounding operations are performed on the first sketch value until the value is smaller than m, and a final result is rounded to obtain the corresponding first physical node; and a modulus operation may also be performed on the number of all physical nodes in the cluster system by each first sketch value to obtain the first physical node which corresponds to each first sketch value and is in the cluster system; and in the embodiment of the present invention, the latter may be adopted, so that:

the identifying unit 92 is specifically configured to perform a modulus operation on the number of all physical nodes in the cluster system by each first sketch value to obtain the first physical node which corresponds to each first sketch value and is in the cluster system.

A sending unit 93 is configured to send each first sketch value to the corresponding first physical node for a query.

After receiving a query request sent by the sending unit 93, another node in the cluster system queries, according to a locally stored index table, whether there is a storage address corresponding to the first sketch value. In the embodiment of the present invention, each or most physical nodes in the cluster system store an index table, where correspondence between a sketch value and a storage address of a stored data block represented by the sketch value is stored in the index table, the index table is stored in a physical node in the cluster system according to a preset policy, and a data block and fingerprint information corresponding to the data block are stored in a storage region pointed to by a different storage address.

A receiving unit 94 is configured to receive at least one response message from first physical nodes corresponding to the n first sketch values, and obtain a first storage address from the response message.

The receiving unit 94 may include: a statistics collecting subunit 941, configured to obtain the storage address corresponding to the first sketch value from the response message, and collect statistics about the number of hits of each storage address carried in the response message; and an address obtaining subunit 942, configured to select, according to a statistical result of the statistics collecting subunit 941, s storage addresses having the largest number of hits as the first storage address, where s is larger than or equal to 1.

A querying unit 95 is configured to compare a fingerprint of a data block stored in a storage region pointed to by the first storage address with the fingerprint of each data block obtained through dividing the received data stream, and query a duplicate data block, where a non-duplicated data block obtained by the querying unit 95 is used as a new data block.

An updating unit 96 is configured to obtain at least one second sketch value representing the new data block, identify, according to the second algorithm, a second physical node corresponding to each second sketch value in the second sketch value, and store correspondence between each second sketch value and a storage address of a data block represented by each second sketch value in the corresponding second physical node.

An algorithm for obtaining the second sketch value representing the new data block by the updating unit 96 may be the same as the first algorithm for obtaining the first sketch value, which is not limited here.

The correspondence between each second sketch value and a storage address of a data block represented by each second sketch value is used as one index entry in the index table. In the embodiment of the present invention, the updating unit 96 stores the index table in a physical node according to a set policy, there is no direct relationship between data in an index table of a certain physical node and data in the physical node, and the index table is just stored in the certain physical node according to a set allocation policy. Reference may be made to the description in the foregoing method for the description of the index table, and details are not repeatedly described here.

Referring to the description in the foregoing method, in specific implementation, there may be multiple manners for the sketch value obtaining unit 91 to obtain, according to the first algorithm, the n first sketch values representing the data stream. For example, the sketch value obtaining unit 91 may include: a fingerprint grouping subunit 911 and an obtaining subunit 912, where:

the fingerprint grouping subunit 911 is configured to group fingerprints of the m data blocks of the data stream into n first fingerprint groups, where each first fingerprint group includes fingerprints of at least two data blocks; and the obtaining subunit 912 is configured to obtain a first sketch value representing each fingerprint group, so as to obtain the n first sketch values.

The obtaining subunit 912 may be specifically configured to select a smallest fingerprint from each fingerprint group as a first sketch value representing a fingerprint group to which the smallest fingerprint belongs.

The receiving unit 94 of the data processing apparatus in a cluster system may be further configured to: for example, in a case that the storage address fed back by the first physical node is not received after each first sketch value is sent to the corresponding first physical node for a query, use a data block obtained through dividing the data stream as a non-duplicated data block, and then trigger the updating unit 96.

The apparatus provided by the embodiment of the present invention may be set in a controller of a storage node in the cluster system, and is configured to perform the foregoing data processing method. Reference may be made to the description in the method embodiment for the detailed description of functions of all units, and details are not repeatedly described here.

Through the data processing apparatus in a cluster system provided by the embodiment of the present invention, when a duplicate data query is performed on the received data stream, the first physical node which corresponds to each first sketch value and is in the cluster system is identified according to the first sketch value representing the data stream, and then, the first sketch value representing the data stream is sent to the identified physical node for the duplicate data query, and a procedure of the duplicate data query does not change with an increase of the number of nodes in the cluster system; therefore, a calculation amount of each node does not increase with an increase of the number of nodes in the cluster system.

When finding, through the query, non-duplicated data, the querying unit 95 may regard the non-duplicated data as a new data block and store the new data block in a single instance repository; therefore, the embodiment of the present invention may further include:

A write address obtaining unit 97 is configured to: according to a preset storage policy, select a storage address at which the new data block and a fingerprint of the new data block are written.

A writing unit 98 is configured to: when a preset storage condition is met, write the new data block and the fingerprint of the new data block into a storage region corresponding to the selected storage address.

There may be multiple storage policies of the new data block of the write address obtaining unit 97. For example, the write address obtaining unit 97 includes:

a load information obtaining subunit 971, configured to obtain load information of each physical node in the cluster system; and an address selecting subunit 972, configured to select, according to the load information, a physical node into which data is migrated, and obtain, from the selected physical node into which data is migrated, the storage address at which the new data block and the fingerprint of the new data block are written.

There may be multiple methods for the address selecting subunit 972 to select, according to the load information, the storage address at which the new data is written. For example, when it is identified, according to the load information obtained by the load information obtaining subunit 971, that an average load value of all physical nodes in the cluster system exceeds a preset first preset threshold, a node into which data is written is selected from a physical node whose load value is smaller than the average load value, and the storage address at which the new data block and the fingerprint of the new data block are written is obtained from the node into which data is written, and when the average load value of all the physical nodes in the cluster system is smaller than or equal to the first preset threshold, the storage address at which the new data block and the fingerprint of the new data block are written is obtained from the current physical node.

Certainly, in the storage policy of the new data block of the write address obtaining unit 97, the load information may also be not identified, and the address is directly selected from the current physical node; therefore, the write address obtaining unit 97 may be specifically configured to obtain, from the current physical node, the storage address at which the new data block and the fingerprint of the new data block are written.

The writing unit 98 may be configured to, for example, store the new data block in a cache of the current physical node, and when data in the cache of the current physical node reaches a second preset threshold, and the preset storage condition is met, write the new data block and the fingerprint of the new data block into a storage region corresponding to the selected storage address.

For a case that a virtual node is included in the cluster system, at least one virtual node is logically obtained through dividing a physical node in the cluster system, and correspondence (VPT) between all virtual nodes and all the physical nodes in the cluster system is included in each physical node, and in the embodiment of the present invention, it is assumed that at least one virtual node is logically obtained through dividing each physical node, so that:

the identifying unit 92 may be specifically configured to identify, according to the second algorithm, a first virtual node which corresponds to each sketch value in the n first sketch values and is in the cluster system, and obtain, by querying correspondence between a virtual node in the current physical node and a physical node, a first physical node corresponding to the first virtual node, where an obtained non-duplicated data block is used as a new data block; and the updating unit 96 is specifically configured to obtain at least one second sketch value representing the new data block, identify, according to the second algorithm, a second virtual node corresponding to each second sketch value in the second sketch value, identify, according to correspondence between a virtual node and a physical node, a second physical node where the second virtual node is located, and after a storage address of the new data block is obtained, store correspondence between each second sketch value and a storage address of a data block represented by the second sketch value in the second virtual node of the corresponding second physical node.

When implementing the function of identifying, according to the second algorithm, a first virtual node which corresponds to each sketch value in the n first sketch values and is in the cluster system, the identifying unit 92 may perform a modulus operation on the number of all the virtual nodes in the cluster system by each first sketch value to obtain the first virtual node which corresponds to each first sketch value and is in the cluster system.

For a case that a virtual node is included in the cluster system, when a data migration solution in a physical node in the cluster system is performed, the writing unit 98 is further configured to: when a data migration condition is met, integrally migrate at least one virtual node in a physical node whose data needs to be migrated to a target physical node; and the updating unit 96 is further configured to update correspondence between a migrated virtual node in the current physical node and the physical node, and notify another physical node in the cluster system of updating the correspondence between the migrated node and the physical node.

The data migration condition may be preset by a user, may be that data needs to be migrated into a newly-added physical node during capacity expansion of a physical node in the cluster system; and may also be that, for load balancing, data in a physical node whose load is high is migrated into a physical node whose load is low, and the data migration condition is not limited in the embodiment of the present invention.

The data processing apparatus in a cluster system may implement integral migration of a virtual node in a physical node, while a serial number of a virtual node migrated into a new physical node does not change, where a data storage address corresponding to a sketch value in the index table represents a location where data is stored in the virtual node; therefore, as long as an identity of the virtual node does not change, the data storage address does not need to be modified, and only the correspondence between an involved virtual node and a physical node is modified, which simplifies an operation procedure during node extension and reduces the calculation amount to a great extent.

Figure 10:
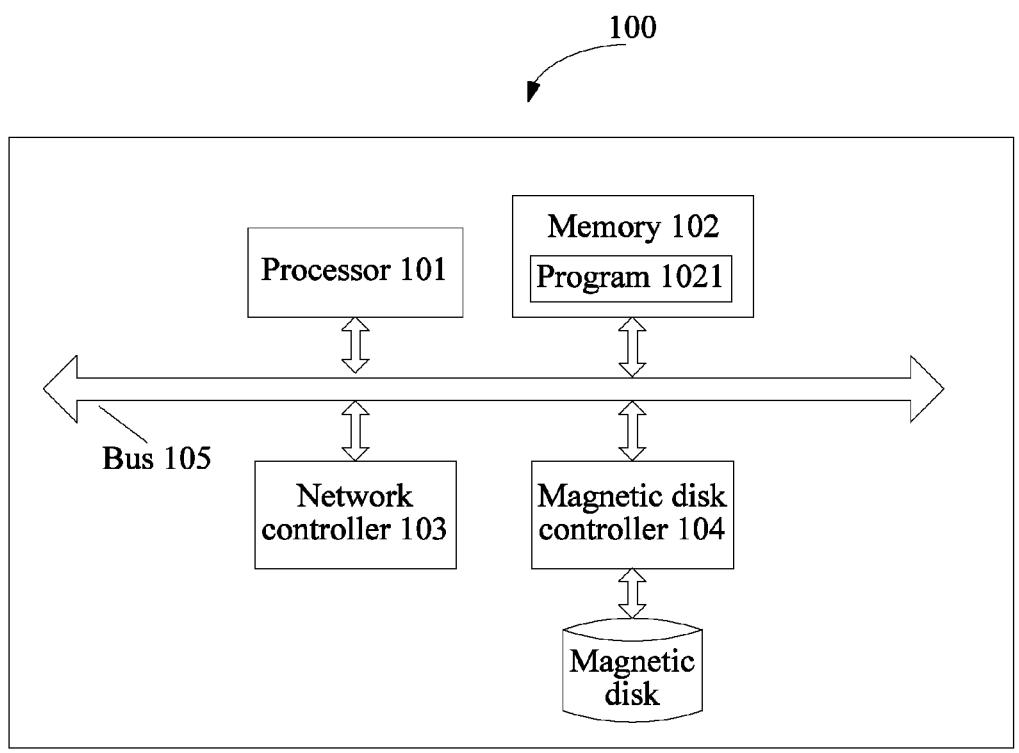
FIG. 10 is a structural diagram of another data processing apparatus in a cluster system according to an embodiment of the present invention.

Referring to FIG. 10, an embodiment of the present invention further provides a data processing apparatus 100 in a cluster system, where the apparatus may be set in a storage node in the cluster system and includes a processor 101, a memory 102, a network controller 103, and a magnetic disk controller 104, where the processor 101, the primary memory 102, the network controller 103, and the magnetic disk controller 104 are connected through a bus 105.

The storage controller 102 is configured to store a program 1021.

The processor 101 is configured to perform the program 1021 in the primary memory 102.

The processor 101 communicates with another node in the cluster system through the network controller 103, and communicates, through the magnetic disk controller 104, with a storage apparatus having a capability of storing data for a long time in a local node, for example, a magnetic disk in FIG. 10. A storage apparatus controlled by the magnetic disk controller 104 is not limited to a magnetic disk, and may also be an apparatus formed by another storage medium.

In specific implementation, the memory 102 may be a primary memory, for example, a memory, and a specific implementation form is not limited in the embodiment of the present invention.

Specifically, the program 1021 may include a program code, where the program code includes a computer operation instruction.

The processor 102 may be a central processing unit CPU or an application specific integrated circuit ASIC (Application Specific Integrated Circuit), or is configured to one or more integrated circuits for implementing the embodiments of the present invention.

Referring to FIG. 9, the program 1021 may include:

A dividing unit 90 is configured to divide a data stream received by a current physical node into m data blocks, and obtain a fingerprint of each data block, where m is an integer larger than or equal to 1.

A sketch value obtaining unit 91 is configured to obtain, according to a first algorithm, n first sketch values representing the data stream, where n is an integer larger than or equal to 1 and smaller than or equal to m.

Reference may be made to the description in the foregoing method for the first algorithm for obtaining the first sketch value, and details are not repeatedly described here.

An identifying unit 92 is configured to identify, according to a second algorithm, a first physical node which corresponds to each sketch value in the n first sketch values and is in the cluster system.

There may be many manners for the identifying unit 92 to identify the first physical node. For example, root extraction and rounding operations are performed on the first sketch value until the value is smaller than m, and a final result is rounded to obtain the corresponding first physical node; and a modulus operation may also be performed on the number of all physical nodes in the cluster system by each first sketch value to obtain the first physical node which corresponds to each first sketch value and is in the cluster system; and in the embodiment of the present invention, the latter is adopted, so that:

the identifying unit 92 is specifically configured to perform a modulus operation on the number of all physical nodes in the cluster system by each first sketch value to obtain the first physical node which corresponds to each first sketch value and is in the cluster system.

A sending unit 93 is configured to send each first sketch value to the corresponding first physical node for a query.

After receiving a query request sent by the sending unit 93, another node in the cluster system queries, according to a locally stored index table, whether there is a storage address corresponding to the first sketch value. In the embodiment of the present invention, each or most physical nodes in the cluster system store an index table, where correspondence between a sketch value and a storage address of a stored data block represented by the sketch value is stored in the index table, the index table is stored in a physical node in the cluster system according to a preset policy, and a data block and fingerprint information corresponding to the data block are stored in a storage region pointed to by a different storage address.

A receiving unit 94 is configured to receive at least one response message from first physical nodes corresponding to the n first sketch values, and obtain a first storage address from the response message, and the receiving unit 94 may include: a statistics collecting subunit 941, configured to obtain the storage address corresponding to the first sketch value from the response message, and collect statistics about the number of hits of each storage address carried in the response message; and an address obtaining subunit 942, configured to select, according to a statistical result of the statistics collecting subunit 941, s storage addresses having the largest number of hits as the first storage address, where s is larger than or equal to 1.

A querying unit 95 is configured to compare a fingerprint of a data block stored in a storage region pointed to by the first storage address with the fingerprint of each data block obtained through dividing the received data stream, and query a duplicate data block, where an obtained non-duplicated data block is used as a new data block.

An updating unit 96 is configured to obtain at least one second sketch value representing the new data block, identify, according to the second algorithm, a second physical node corresponding to each second sketch value in the second sketch value, and store correspondence between each second sketch value and a storage address of a data block represented by each second sketch value in the corresponding second physical node.

An algorithm for obtaining the second sketch value representing the new data block by the updating unit 96 may be the same as the first algorithm for obtaining the first sketch value, which is not limited here.

The correspondence between each second sketch value and a storage address of a data block represented by each second sketch value is used as one index entry in the index table. In the embodiment of the present invention, the updating unit 96 stores the index table in a physical node according to a set policy, there is no direct relationship between data in an index table of a certain physical node and data in the physical node, and the index table is just stored in the certain physical node according to a set allocation policy. Reference may be made to the description in the foregoing method for the description of the index table, and details are not repeatedly described here.

Referring to the description in the foregoing method, in specific implementation, there may be multiple manners for the sketch value obtaining unit 91 to obtain, according to the first algorithm, the n first sketch values representing the data stream. For example, the sketch value obtaining unit 91 may include: a fingerprint grouping subunit 911 and an obtaining subunit 912, where:

the fingerprint grouping subunit 911 is configured to group fingerprints of the m data blocks of the data stream into n first fingerprint groups, where each first fingerprint group includes fingerprints of at least two data blocks; and the obtaining subunit 912 is configured to obtain a first sketch value representing each fingerprint group, so as to obtain the n first sketch values.

The obtaining subunit 912 may be specifically configured to select a smallest fingerprint from each fingerprint group as a first sketch value representing a fingerprint group to which the smallest fingerprint belongs.

The receiving unit 94 of the data processing apparatus in a cluster system may be further configured to: for example, in a case that the storage address fed back by the first physical node is not received after each first sketch value is sent to the corresponding first physical node for a query, use a data block obtained through dividing the data stream as a non-duplicated data block, and then trigger the updating unit 96.

The apparatus provided by the embodiment of the present invention may be set in a controller of a storage node in the cluster system, and is configured to perform the foregoing data processing method. Reference may be made to the description in the method embodiment for the detailed description of functions of all units, and details are not repeatedly described here.

Through the data processing apparatus in a cluster system provided by the embodiment of the present invention, when a duplicate data query is performed on the received data stream, a sampled sketch value is sent to an identified physical node for the duplicate data query, and a procedure of the duplicate data query does not change with an increase of the number of nodes in the cluster system; therefore, a calculation amount of each node does not increase with an increase of the number of nodes in the cluster system.

When finding, through the query, non-duplicated data, the querying unit 95 may regard the non-duplicated data as a new data block and store the new data block in a single instance repository; therefore, the embodiment of the present invention may further include:

A write address obtaining unit 97 is configured to: according to a preset storage policy, select a storage address at which the new data block and a fingerprint of the new data block are written.

A writing unit 98 is configured to: when a preset storage condition is met, write the new data block and the fingerprint of the new data block into a storage region corresponding to the selected storage address.

There may be multiple storage policies of the new data block of the write address obtaining unit 97. For example, the write address obtaining unit 97 includes:

a load information obtaining subunit 971, configured to obtain load information of each physical node in the cluster system; and an address selecting subunit 972, configured to select, according to the load information, a physical node into which data is migrated, and obtain, from the selected physical node into which data is migrated, the storage address at which the new data block and the fingerprint of the new data block are written.

There may be multiple methods for the address selecting subunit 972 to select, according to the load information, the storage address at which the new data is written. For example, when it is identified, according to the load information obtained by the load information obtaining subunit 971, that an average load value of all physical nodes in the cluster system exceeds a preset first preset threshold, a node into which data is written is selected from a physical node whose load value is smaller than the average load value, and the storage address at which the new data block and the fingerprint of the new data block are written is obtained from the node into which data is written, and when the average load value of all the physical nodes in the cluster system is smaller than or equal to the first preset threshold, the storage address at which the new data block and the fingerprint of the new data block are written is obtained from the current physical node.

Certainly, in the storage policy of the new data block of the write address obtaining unit 97, the load information may also be not identified, and the address is directly selected from the current physical node; therefore, the write address obtaining unit 97 may be specifically configured to obtain, from the current physical node, the storage address at which the new data block and the fingerprint of the new data block are written.

The writing unit 98 may be configured to, for example, store the new data block in a cache of the current physical node, and when data in the cache of the current physical node reaches a second preset threshold, and the preset storage condition is met, write the new data block and the fingerprint of the new data block into a storage region corresponding to the selected storage address.

For a case that a virtual node is included in the cluster system, at least one virtual node is logically obtained through dividing a physical node in the cluster system, and correspondence (VPT) between all virtual nodes and the physical nodes in the cluster system is included in each physical node, and in the embodiment of the present invention, it is assumed that at least one virtual node is logically obtained through dividing each physical node, so that:

the identifying unit 92 may be specifically configured to identify, according to the second algorithm, a first virtual node which corresponds to each sketch value in the n first sketch values and is in the cluster system, and obtain, by querying correspondence between a virtual node in the current physical node and a physical node, a first physical node corresponding to the first virtual node, where an obtained non-duplicated data block is used as a new data block; and the updating unit 96 is specifically configured to obtain at least one second sketch value representing the new data block, identify, according to the second algorithm, a second virtual node corresponding to each second sketch value in the second sketch value, identify, according to correspondence between a virtual node and a physical node, a second physical node where the second virtual node is located, and after a storage address of the new data block is obtained, store correspondence between each second sketch value and a storage address of a data block represented by the second sketch value in the second virtual node of the corresponding second physical node.

When implementing the function of identifying, according to the second algorithm, a first virtual node which corresponds to each sketch value in the n first sketch values and is in the cluster system, the identifying unit 92 may perform a modulus operation on the number of all the virtual nodes in the cluster system by each first sketch value to obtain the first virtual node which corresponds to each first sketch value and is in the cluster system.

For a case that a virtual node is included in the cluster system, when a data migration solution in a physical node in the cluster system is performed, the writing unit 98 is further configured to: when a data migration condition is met, integrally migrate at least one virtual node in a physical node whose data needs to be migrated to a target physical node; and the updating unit 96 is further configured to update correspondence between a migrated virtual node in the current physical node and the physical node, and notify another physical node in the cluster system of updating the correspondence between the migrated node and the physical node.

The data migration condition may be preset by a user, may be that data needs to be migrated into a newly-added physical node during capacity expansion of a physical node in the cluster system; and may also be that, for load balancing, data in a physical node whose load is high is migrated into a physical node whose load is low, and the data migration condition is not limited in the embodiment of the present invention.

The data processing apparatus in a cluster system may implement integral migration of a virtual node in a physical node, while a serial number of a virtual node migrated into a new physical node does not change, where a data storage address corresponding to a sketch value in the index table represents a location where data is stored in the virtual node; therefore, as long as an identity of the virtual node does not change, the data storage address does not need to be modified, and only the correspondence between an involved virtual node and a physical node is modified, which simplifies an operation procedure during node extension and reduces the calculation amount to a great extent.

An embodiment of the present invention further provides a computer program product for data processing, where the computer program product includes a computer readable storage medium storing a program code, where an instruction included in the program code is used to:

divide a data stream received by a current physical node into m data blocks, obtain a fingerprint of each data block, and obtain, according to a first algorithm, n first sketch values representing the data stream, where m is an integer larger than or equal to 1, and n is an integer larger than or equal to 1 and smaller than or equal to m.

identify, according to a second algorithm, a first physical node which corresponds to each first sketch value in the n first sketch values and is in the cluster system, and send each first sketch value to the corresponding first physical node for a query;

receive at least one response message from first physical nodes corresponding to the n first sketch values, and obtain a first storage address from the response message; compare a fingerprint of a data block stored in a storage region pointed to by the first storage address with the fingerprint of each data block obtained through dividing the data stream, and query a duplicate data block, where an obtained non-duplicated data block is used as a new data block; and obtain at least one second sketch value representing the new data block, identify, according to the second algorithm, a second physical node corresponding to each second sketch value in the second sketch value, and store correspondence between each second sketch value and a storage address of a data block represented by each second sketch value in a corresponding second physical node.

The computer program product for data processing provided by the embodiment of the present invention includes the computer readable storage medium storing the program code, where the instruction included in the program code may be used to perform the method in the foregoing method embodiments, reference may be made to the method embodiments for specific implementation, and details are not repeatedly described here.

It may be clearly understood by persons skilled in the art that, for the purpose of convenient and brief description, reference may be made to the corresponding processes in the method embodiments for specific working processes of the foregoing systems, apparatuses, and units, and details are not repeatedly described here.

In the several embodiments provided in the present application, it should be understood that the disclosed system, apparatus, and method may be implemented in other manners. For example, the described apparatus embodiments are merely exemplary. For example, dividing of the units is merely a kind of logical function dividing, and there may be other dividing manners in actual implementation. For example, a plurality of units or components may be combined or integrated into another system, or some features may be ignored or not performed. In addition, the shown or discussed mutual couplings or direct couplings or communication connections may be implemented through some communication interfaces. The indirect couplings or communication connections between the apparatuses or units may be implemented in electronic, mechanical or other forms.

The units described as separate parts may or may not be physically separate, and parts shown as units may or may not be physical units, may be located in one position, or may also be distributed on a plurality of network units. A part or all of the units may be selected according to actual needs to achieve the objectives of the solutions of the embodiments.

In addition, functional units in the embodiments of the present invention may be integrated into one processing unit, each of the units may also exist alone physically, and two or more than two units are also integrated into one unit.

When the functions are implemented in a form of a software functional unit and sold or used as an independent product, the functions may be stored in a computer-readable storage medium. Based on such understanding, the technical solutions of the present invention essentially, or the part contributing to the prior art, or part of the technical solutions may be embodied in the form of a software product. The computer software product is stored in a storage medium, and includes several instructions for instructing a computer device (which may be a personal computer, a server, or a network device, and so on) to perform all or a part of the steps of the method described in the embodiment of the present invention. The foregoing storage medium includes: any medium that is capable of storing program code, such as a USB flash disk, a removable hard disk, a read-only memory (ROM, Read-Only Memory), a random access memory (RAM, Random Access Memory), a magnetic disk, or an optical disk.

The foregoing description is merely specific embodiment manners of the present invention, but is not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method of data de-duplication performed by a first processing node in storage system having a plurality of processing nodes each maintaining multiple data containers for storing de-duplicated data chunks, comprising:

receiving a data stream to be stored after de-duplication;

dividing a segment of the data stream into a plurality of super-chunks, each super-chunk including multiple data chunks;

deriving a first super-chunk identification (SID) for a super-chunk of the segment;

identifying a second processing node of the storage system that corresponds to the first SID;

querying the second processing node for a first data container that corresponds to the first SID, wherein the first data container is maintained by a third processing node of the storage system;

obtaining fingerprints of data chunks stored in the first data container that corresponds to the first SID;

based on a comparison between fingerprints of data chunks in the super-chunk and the obtained fingerprints to identify new data chunks whose signatures are not found in the obtained fingerprints;

storing the new data chunks in a local buffer of the first processing node;

selecting, according to a preset storage policy, a second data container of the storage system to write data in the local buffer;

deriving a second SID for data of the local buffer;

identifying, by the same way for identifying the second processing node, a fourth processing node of the storage system that corresponds to the second SID for data of the local buffer; and storing correspondence between the second SID for data of the local buffer and the second data container in the fourth processing node.

2. The method according to claim 1, wherein a virtual node is logically obtained through dividing each of the plurality processing node in the storage system, and correspondence between a virtual node and a processing node in the storage system is comprised in each processing node;

the identifying a second processing node of the storage system that corresponds to the first SID comprised:
identifying a first virtual node of the storage system that corresponds to the first SID;
obtaining, by querying correspondence between a virtual node and a processing node, the second processing node corresponding to the first virtual node.

3. The method according to claim 2, wherein the identifying, by the same way for identifying the second processing node, a fourth processing node of the storage system that corresponds to the second SID for data of the local buffer comprised:

identifying, by the same way for identifying the first virtual node, a second virtual node;
obtaining, by querying the correspondence between a virtual node and a processing node, a fourth processing node;
the storing the correspondence between the second SID for data of the local buffer and the second data container in the fourth processing node comprised:
storing the correspondence between the second SID for data of the local buffer and the second data container in the second virtual node of the corresponding to the fourth processing node.

4. The method according to claim 2, further comprising:
when a data migration condition is met to the first processing node, integrally migrating a virtual node in the first processing node whose data needs to be migrated to a target processing node; and
updating correspondence between the migrated virtual node and the target processing node, and notifying another processing node in the storage system of updating the correspondence between the migrated virtual node and the target processing node.

5. The method according to claim 1, wherein selecting, according to a preset storage policy, a second data container of the storage system to write data in the local buffer comprised: storing data in the local buffer in the second data container of a fifth processing node when a preset storage condition is met, wherein the fifth processing node has least load in the storage system.

6. The method according to claim 1, wherein selecting, according to a preset storage policy, a second data container of the storage system to write data in the local buffer comprised:
storing data in the local buffer in the second data container of the first processing node when a preset storage condition is met.

7. A data processing apparatus for performing data de-duplication applied to a storage system having a plurality of processing nodes each maintaining multiple data containers for storing de-duplicated data chunks, comprising:

a memory configured to store instructions; and
a processor coupled to the memory and configured to execute the instructions to: receive a data stream to be stored after de-duplication;
divide a segment of the data stream into a plurality of super-chunks, each super-chunk including multiple data chunks;
derive a first super-chunk identification (SID) for a super-chunk of the segment;
identify a second processing node of the storage system that corresponds to the first SID;
query the second processing node for a first data container that corresponds to the first SID, wherein the first data container is maintained by a third processing node of the storage system;
obtain fingerprints of data chunks stored in the first data container that corresponds to the first SID;
based on a comparison between fingerprints of data chunks in the super-chunk and the obtained fingerprints to identify new data chunks whose signatures are not found in the obtained fingerprints;
store the new data chunks in a local buffer of the first processing node;
select, according to a preset storage policy, a second data container of the storage system to write data in the local buffer;
derive a second SID for data of the local buffer;
identify, by the same way for identifying the second processing node, a fourth processing node of the storage system that corresponds to the second SID for data of the local buffer; and
store correspondence between the second SID for data of the local buffer and the second data container in the fourth processing node.

8. The apparatus according to claim 7, wherein a virtual node is logically obtained through dividing each of the plurality processing node in the storage system, and correspondence between a virtual node and a processing node in the storage system is comprised in each processing node;

wherein the identify a second processing node of the storage system that corresponds to the first SID comprise the steps of:
identifying a first virtual node of the storage system that corresponds to the first SID;
obtaining, by querying correspondence between a virtual node and a processing node, the second processing node corresponding to the first virtual node.

9. The apparatus according to claim 8, wherein the identify, by the same way for identifying the second processing node, a fourth processing node of the storage system that corresponds to the second SID for data of the local buffer comprises the steps of:
identifying, by the same way for identifying the first virtual node, a second virtual node;
obtaining, by querying the correspondence between a virtual node and a processing node, a fourth processing node;
the storing the correspondence between the second SID for data of the local buffer and the second data container in the fourth processing node comprises:
storing the correspondence between the second SID for data of the local buffer and the second data container in the second virtual node of the corresponding to the fourth processing node.

10. The apparatus according to claim 8, wherein the processor is further configured to execute the instructions to:

when a data migration condition is met to the first processing node, integrally migrate a virtual node in the first processing node whose data needs to be migrated to a target processing node; and update correspondence between the migrated virtual node and the target processing node, and notify another processing node in the storage system of updating the correspondence between the migrated virtual node and the target processing node.

11. The apparatus according to claim 7, wherein select, according to a preset storage policy, a second data container of the storage system to write data in the local buffer comprises the steps of:

storing data in the local buffer in the second data container of a fifth processing node when a preset storage condition is met, wherein the fifth processing node has least load in the storage system.

12. The apparatus according to claim 7, wherein select, according to a preset storage policy, a second data container of the storage system to write data in the local buffer comprises the steps of:

storing data in the local buffer in the second data container of the first processing node when a preset storage condition is met.

13. A method of data de-duplication performed by a first processing node in storage system having a plurality of processing nodes each maintaining multiple data containers for storing de-duplicated data chunks, comprising:

receiving a data stream to be stored after de-duplication;

dividing a segment of the data stream into a plurality of super-chunks, each super-chunk including multiple data chunks;

deriving a first SID for each of the super-chunks and identifying a first processing node of the storage system that corresponds to said each super-chunk based on the SID of said each super-chunk;

sending the first SIDs of the super-chunks to respective corresponding processing nodes;

receiving responses from at least a subgroup of the corresponding processing nodes, wherein each response identifies container IDs that correspond to first SIDs send to the corresponding processing node;

selecting, from the container IDs in the responses from the subgroup of the processing nodes, a subset of container IDs based on times of the container IDs being identified in the responses;

identifying, based on querying containers corresponding to the subset of container IDs and using fingerprint comparisons, new data chunks in the super-chunks of the segment;

storing the new data chunks in a local buffer of the first processing node;

selecting, according to a preset storage policy, a second data container of the storage system to write data in the local buffer;

deriving a second SID for data of the local buffer;

identifying, by the same way for identifying the corresponding processing node, a second processing node of the storage system that corresponds to the second SID for data of the local buffer; and storing correspondence between the second SID for data of the local buffer and the second data container in the fourth processing node.

* * * * *